May 24, 1955 W. BERRY ET AL 2,709,146
PRODUCTION OF MOISTUREPROOF REGENERATED CELLULOSE FILMS
Filed Aug. 14, 1951
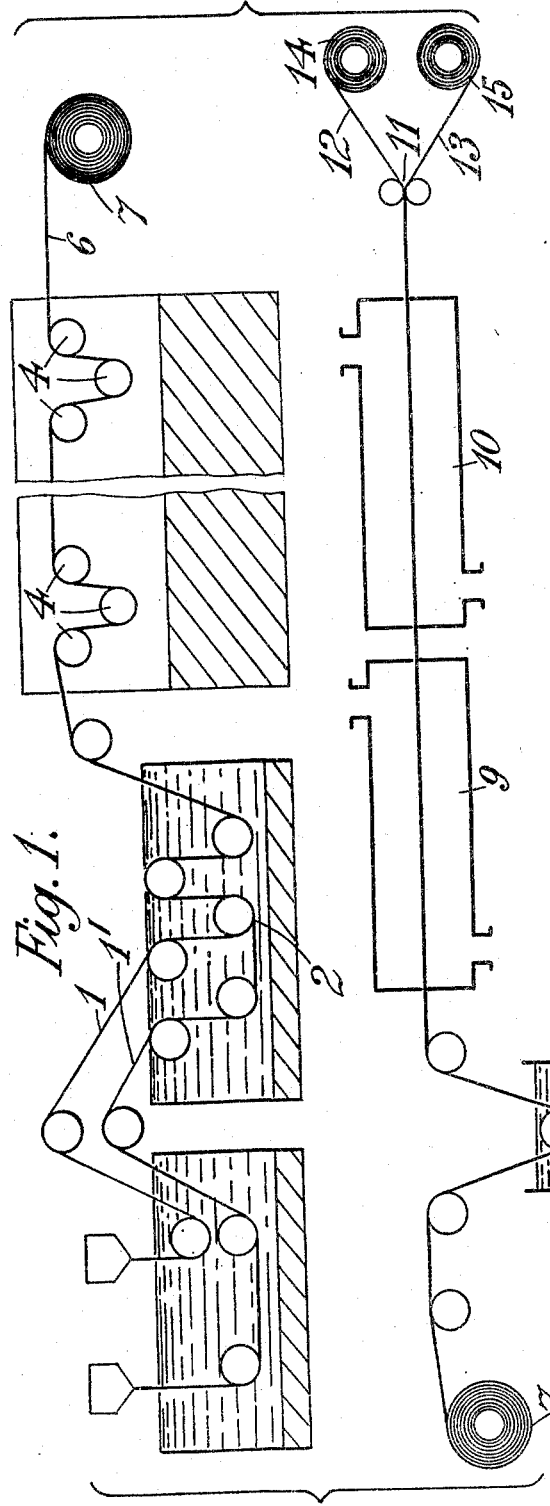
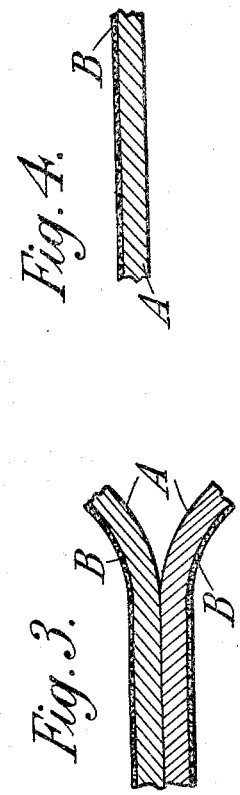
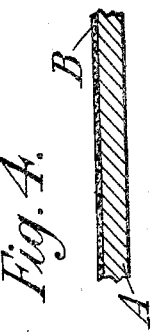
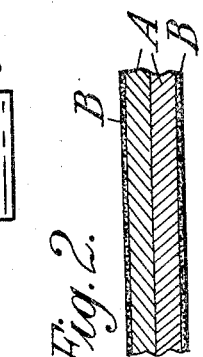

United States Patent Office 2,709,146
Patented May 24, 1955

2,709,146

PRODUCTION OF MOISTUREPROOF REGENERATED CELLULOSE FILMS

William Berry, Durleigh, Bridgwater, Somerset, and Charles Robert Oswin, Burrington, Somerset, England, assignors to British Cellophane Limited, Bridgwater, England, a British company Application August 14, 1951, Serial No. 241,884

Claims priority, application Great Britain September 18, 1950

19 Claims. (Cl. 154—103)

This invention is for improvements in or relating to the production of moistureproof regenerated cellulose films.

Regenerated cellulose film coated on one side with a moistureproofing coating and uncoated on the other side is known to have advantages for use in the wrapping of moist products, such as meat, because such film if applied with its uncoated surface towards the product to be wrapped, remains clear throughout the life of the pack, in contradistinction to regenerated cellulose film coated on both sides with a moistureproofing coating, which in similar circumstances becomes coated on the inner surface with globules of condensed water vapour, with consequent impairment of the good appearance of the pack, and with encouragement of microbial growth.

Hitherto it has been difficult to produce, on the conventional machines, regenerated cellulose film coated on one side only with a moistureproofing coating, for the reason that such film absorbs water vapour from the atmosphere at different rates at its two sides and thus, even during manufacture, shows so strong a tendency to curl that any long run of the film is handled only with extreme difficulty.

One of the objects of the present invention is to provide a process for the production of moistureproof regenerated cellulose film, coated on one side only with a moistureproofing coating, in which process curling of the coated film during manufacture is eliminated or greatly reduced.

The process of manufacturing regenerated cellulose film consists, for example, in regenerating cellulose from a film of viscose by means of a dilute aqueous solution containing sulphuric acid, whereby gel regenerated cellulose film is formed, purifying the gel film by a series of treatments with aqueous solutions of electrolytes, washing with water after each treatment, and then treating the purified gel film with an aqueous medium comprising glycerine in solution, and in some cases also colloidal matter in suspension. The treated film is then passed between a pair of nip-rollers to remove surface liquid, dried by passage over heated rollers and, in cases where moistureproof film is required, the dried film is coated with a moistureproofing coating.

By the expression "gel" as employed in the present specification and in the appended claims is meant the swollen water-containing state which the films initially possess when coagulated in manufacture before they are dried, or at all events while they still remain swollen prior to being dried.

The function of the colloidal matter which may be suspended in the aqueous glycerine bath is to modify the surface of the film or to prepare it for further treatment. If the finished film is to be used in uncoated sheet form, the presence of suspended colloidal matter of the kind which serves as an anti-sticking agent, e. g. silica, is desirable for the reduction or elimination of optical adhesion. Optical adhesion is the adhesion which exists between two smooth surfaces in optical contact i. e. in contact such that there is insufficient air present between the smooth contacting surfaces to show a change in refractive index, e. g. by total internal reflection. On the other hand, if the purpose of the suspended colloidal matter is to promote adhesion of the moistureproofing coating to the cellulose base under conditions of high moisture content, the colloidal matter may be, for example, a partially condensed product of urea or melamine with formaldehyde.

The present invention provides a process for the production of moistureproof regenerated cellulose film, coated on one side only with a moistureproofing coating, which process comprises bringing a pair of purified gel regenerated cellulose films into intimate contact without the intervention of an adhesive, drying the pair of films in continuous intimate contact to form two optically adhered plies of a dried single web, coating said dried single web on both sides with a moistureproofing coating, and finally separating the two plies of the coated web.

Each separated ply is a regenerated cellulose film, uncoated on one side, and coated on the other side with a moistureproofing coating.

The invention includes moistureproof regenerated cellulose film, coated on one side only with a moistureproofing coating, whenever produced by the process in accordance with the invention.

The pair of purified gel regenerated cellulose films are preferably, though not necessarily, produced simultaneously on the same casting machine. A process for producing simultaneously two or more sheets of cellulose is described in British Patent No. 423,365, accepted January 29, 1935. The regenerated cellulose films of the pair should preferably be of similar thickness when dried, and should preferably each have been produced from supplies of viscose of similar characteristics, e. g. in respect of composition and of ageing.

Figure 1 is a diagrammatic view of an apparatus capable of carrying out the process of this invention;

Figure 2 is a view, in cross section on an enlarged scale, of the dried single web coated on both sides with moistureproofing coating;

Figure 3 is a view similar to Figure 2 showing the two plies of the coated web in the act of being separated; and Figure 4 is a view showing, in cross section, on an enlarged scale, the moistureproof regenerated cellulose film coated on one side only with the moistureproofing coating.

Referring to Figure 1, the pair of purified gel regenerated cellulose films 1 and 1', cast from viscose and purified in the known way, are brought into intimate contact at 2 without the intervention of an adhesive, and the pair of films is dried in continuous intimate contact by passage over heated drying rollers 4 in a drying oven to form two optically adhered plies of a single dried web 6. The single dried web is wound into a roll at 7. The single dried web is later unwound from the roll 7, and is coated on both sides by passage through a bath of liquid moistureproofing coating composition 8. The solvent of the liquid moistureproofing coating composition is removed, by evaporation by heat by passing the coated web through the drying chamber 9, and the dried coated web is rehumidified by passage through the chamber 10, where it is exposed to hot moist air. The two plies of the coated web are finally separated at 11, to form two moistureproof regenerated cellulose films 12 and 13, which are wound up as rolls 14 and 15.

Referring to Figures 2, 3 and 4, A represents regenerated cellulose base film and B the moistureproofing surface coating.

In some cases, the purified gel regenerated cellulose films, prior to having been brought together into intimate contact, may be quite free from colloidal matter, other than that which may have been deposited inadvertently from the water supply. In other cases, where a limited weakening of the strength of the optical adhesion between the two plies is desirable, the pair of purified gel regenerated cellulose films, prior to having been brought together into intimate contact may be treated separately with small proportions of a colloidal anti-sticking agent, such as silica, provided always that the so-treated plies, after having been brought together, are further treated in intimate contact so as to gain on their outer faces an amount of anti-sticking agent which is substantially greater than that held between the inner faces.

The pair of purified gel regenerated cellulose films, after having been brought into continuous intimate contact but prior to drying, may be treated with a liquid aqueous medium comprising colloidal matter in suspension, and conveniently also glycerine, or other known water-soluble softening agent for regenerated cellulose, in solution. The gel films may be treated together or singly with a preliminary bath comprising an aqueous solution of the softening agent only, if desired, before being treated with the final bath of an aqueous medium comprising softening agent in solution and colloidal matter in suspension. Surface liquid is removed from the pair of gel films in continuous intimate contact by passage through a pair of nip rollers just prior to drying. Drying is effected by passage, under slight tension, over heated drying rollers in the normal way.

The colloidal matter in suspension, with which the pair of purified gel regenerated cellulose films may be treated, may be a sizing material, such as silica or sodium silicate, adapted to prevent adhesion of adjacent films, or may consist of colloidal particles of a partially condensed condensation product of melamine and formaldehyde dispersed in an acidified aqueous medium, but preferably the colloidal matter comprises hydrophilic colloidal particles of a partially condensed condensation product of urea and formaldehyde dispersed in a substantially neutral (pH 6 to 7.5) aqueous medium.

The coating composition for applying the moistureproofing coating is liquid and may be, for example, an aqueous dispersion of a known copolymer, such as vinylidene chloride/acrylonitrile copolymer, but is preferably a solution of nitrocellulose, paraffin wax of high melting point (at least 60° C.), and other known ingredients, dissolved in an organic solvent. Films of regenerated cellulose coated with a moistureproof coating comprising a cellulosic base, such as cellulose ether or ester, a gum or a resin, a wax or the like, and preferably a plasticiser, are already known. One of the objects of such coatings is to render the film less liable to allow passage of water-vapour therethrough. Other moistureproofing coating compositions which may be used include organic solvent solutions of organic solvent-soluble vinylidene chloride copolymers known to the art, and known molten mixtures of ethyl cellulose, resin, plasticiser and wax.

In cases where the pair of purified gel regenerated cellulose films, after having been brought into continuous intimate contact but prior to drying, are treated with an aqueous medium comprising hydrophilic colloidal particles of a partially condensed condensation product of urea and formaldehyde dispersed in a substantially neutral aqueous medium, an acidic substance such as citric acid or sulphur dioxide, which acts as a catalyst for the further condensation of the partially condensed condensation product of urea and formaldehyde, should be dissolved in the liquid moistureproofing coating composition, in order to bring about by its catalytic action further condensation of the partially condensed condensation product to its hardened, insoluble form during the course of the manufacture.

If desired, with the object of facilitating unwinding, an aqueous dispersion of colloidal silica may be added to the liquid aqueous medium comprising dispersed hydrophilic colloidal particles of a partially condensed condensation product of urea and formaldehyde, but in such a case care should be taken to see that the colloidal silica particles and the colloidal particles of partially condensed condensation product of urea and formaldehyde bear electric charges of the same sign.

Preferably, for ease of application, the colloidal silica particles and the colloidal particles of partially condensed condensation product of urea and formaldehyde suspended in the liquid aqeous medium carry electric charges of opposite sign to that of the electric charge developed by the purified gel regenerated cellulose film in contact with the liquid aqueous medium. The electric charge developed by the purified gel regenerated cellulose film when immersed in contact with the liquid aqueous medium, is normally of negative sign. Thus preferably the colloidal silica particles and the colloidal particles of partially condensed condensation product of urea and formaldehyde bear electric charges of positive sign, with the result that the particles are absorbed rapidly from the dispersion on to the film, to which they attach themselves strongly. Colloidal silica particles and colloidal particles of partially condensed condensation product of urea and formaldehyde carrying in liquid aqueous dispersion electric charges of positive sign may be obtained by adding to the liquid medium, before, during or after the formation of these colloidal particles, a small proportion of a water-soluble cationic surface-active agent to yield, for example, a 1% aqueous solution thereof. For the cationic surface-active agent, there may be used any water-soluble organic compound, the molecule of which comprises a quaternary ammonium or phosphonium group or a ternary sulphonium group and, attached directly to the nitrogen, phosphorus, or sulphur atom respectively, an alkyl group comprising at least 8 carbon atoms. Cetyl trimethyl ammonium bromide, tetradecyl pyridinium bromide, and cetyl triethanol ammonium iodide are preferred compounds of this class.

The plies of the coated single web may be separated, by drawing them apart, at any time after the application and drying of the moistureproofing coating composition, but it is preferred that they be left together until they are required for use. It is possible, during the slitting operation or subsequently, to separate the coated single web in such a way that the web unwinds and rewinds with the finished coated sides of the plies turned inwardly towards each other and in contact, while the two outside surfaces are of uncoated regenerated cellulose film.

Specific methods of carrying the invention into effect will now be described by way of illustration with reference to the following examples.

Throughout the present specification, parts and percentages are parts and percentages by weight unless otherwise stated.

*Example I*

Moistureproof regenerated cellulose film, coated on one side only with a moistureproofing coating, was produced in the way described below:

Two gel regenerated cellulose films (thickness of each=0.0008" when dry), cast from viscose and purified in the known way, but prior to treatment with colloidal matter in suspension, were brought together and, in continuous intimate contact, were immersed for 20 seconds in a neutral (pH 7) 7% aqueous solution of glycerine at 30° C., containing dispersed therein 0.2% of colloidal silica and 0.4% of a hydrophilic partially condensed condensation product of urea and formaldehyde, added in aqueous dispersion. The sign of the electric charge of the particles of silica and of the partially condensed urea/formaldehyde condensation product had been made positive by previous treatment of an aqueous dispersion thereof with cetyl pyridinium bromide. Excess treating liquid was removed from the surfaces of the united films by means of squeegees, and the united films, still in continuous intimate contact, were dried by passage under slight tension over drying rollers heated by means of hot water to 90° C., to form two optically adhered plies of a dried single web.

The dried single web was coated on both sides with a moistureproofing coating, 0.00004" thick, by applying to both sides of the web a liquid moistureproofing coating composition having the following formulation:

| | Parts |
|---|---|
| Nitrocellulose (12% $N_2$) medium viscosity | 7.4 |
| Gum dammar | 5.0 |
| Tricresyl phosphate | 1.8 |
| Paraffin wax (M. P. 60° C.) | 0.6 |
| Ethyl acetate | 54.0 |
| Toluene | 22.6 |
| Ethyl alcohol | 6.8 |
| n-Butyl acetate | 1.8 |
| | 100.0 |

The solvent was removed from the coating by evaporation by heat at a temperature above the melting point of the wax.

The edges of the coated single web were trimmed, and the web was separated into two moistureproof films each coated on one side only with a moistureproofing coating.

The moistureproof films, each coated on one side only with a moistureproofing coating, had a permeability value of 180.

When the moistureproof film, thus coated on one side only with a moistureproofing coating, was applied as sheet wrapping material to raw meat, with the plain (uncoated) side turned towards the meat, no condensation developed on the film during a period of 2 days, which is the extreme life of the pack. The moistureproofing coating was anchored securely to the base film.

*Example II*

Moistureproof regenerated cellulose film, coated on one side only with a moistureproofing coating, was produced in the way described in Example 1, but with the omission of the hydrophilic partially condensed condensation product of urea and formaldehyde from the aqueous treating solution, and with increase of the glycerine content of the aqueous solution to 9%. After coating and trimming, the coated single web was rewound in such a way as to present two plain (uncoated) surfaces outwards and to have the coated surfaces in the interior of the web.

The moistureproof films, each coated on one side only with a moistureproofing coating, had a permeability value of 240.

*Example III*

Moistureproof regenerated cellulose film, coated on one side only with a moistureproofing coating, was produced in the way described in Example II, except that the step of making the previously negative sign of the electric charge of the particles of silica positive by previous treatment of an aqueous dispersion thereof with cetyl pyridinium bromide was omitted.

The moistureproof films, each coated on one side only with a moistureproofing coating, had a permeability value of 190.

*Example IV*

Moistureproof regenerated cellulose film, coated on one side only with a moistureproofing coating, was produced in the way described below:

Two gel regenerated cellulose films (thickness of each = 0.0008" when dry), cast from viscose and purified in the known way, but prior to treatment with colloidal matter in suspension, were brought together and, in continuous intimate contact, were immersed for 20 seconds in a neutral (pH 7) 7% aqueous solution of glycerine at 30° C., containing dispersed therein 0.2% of colloidal silica and 0.4% of a hydrophilic partially condensed condensation product of urea and formaldehyde, added in aqueous dispersion. The sign of the electric charge of the particles of silica and of the partially condensed urea/formaldehyde condensation product had been made positive by previous treatment of an aqueous dispersion thereof with cetyl pyridinium bromide. Excess treating liquid was removed from the surfaces of the united films by means of squeegees, and the united films, still in continuous intimate contact, were dried by passage under slight tension over drying rollers heated to 90° C., to form two optically adhered plies of a single web.

A moistureproof layer of vinylidene chloride copolymer was applied to both surfaces of the dried single web by introducing into a nip formed between two surfaces of the web to be coated an aqueous dispersion of the said copolymer and separating the two surfaces, each with its coating, in a time less than the time of imbibition of water from the aqueous dispersion of the said copolymer through either of the two surfaces.

The time of imbibition of water from the aqueous dispersion of the copolymer through either of the two surfaces was found to be about 1 second.

The aqeuous dispersion of the vinylidene chloride copolymer was prepared by heating the following mixture, with agitation, in an oxygen-free atmosphere for 3 hours at 40° C.:

| | Parts |
|---|---|
| Monomeric vinylidene chloride (re-distilled) | 94.5 |
| Monomeric methyl methacrylate | 5.0 |
| Itaconic acid | 0.5 |
| Sodium salt of a condensation product of formaldehyde with beta-naphthalene sulphonic acid | 2.0 |
| Ammonium persulphate | 0.8 |
| Sodium metabisulphite | 0.4 |
| Water (pH=7) | 230.0 |

The aqueous copolymer dispersion, thus obtained, had after standing for 24 hours a pH of 4.5.

The aqueous dispersion of the vinylidene chloride copolymer was applied to both outside surfaces of the dried single web in such quantity that, after evaporation of the excess water and consolidation of the coating by heat a coating of thickness equivalent to 2 gms./m.² was left on each side of the web.

The coated single web was subsequently trimmed at its edges and separated into two moistureproof regenerated cellulose films each coated on one side only with a moistureproofing coating.

The moistureproof films, each coated on one side only with a moistureproofing coating, had a permeability value of 140. The heat-seal bond strength exceeded 600 grams. The moistureproofing coating was retained tenaciously by the base film, even when the moistureproofed film was in direct contact with water for prolonged periods of time, for example in direct contact with boiling water for a period of 25 minutes.

The moistureproof films showed little tendency to fog when used as a wrapper with the uncoated side presented to vegetables or other moist commodities.

*Example V*

Moistureproof regenerated cellulose film, coated on one side only with a moistureproofing coating, was produced in the way described below:

Two gel regenerated cellulose films (thickness of each = 0.0011" when dry) were cast simultaneously from viscose on a casting machine, and after purification in the usual way were passed, while separated, through a bath of water at 30° C. containing, dispersed therein, 0.1% of colloidal silica. The two films were then brought together and, in continuous intimate contact, were passed through a bath containing 3% glycerine, 2% urea and 0.2% colloidal silica. Excess treating liquid was removed from the surfaces of the united films by means of squeegees, and the united films, still in continuous intimate contact, were dried by passage under slight tension over heated drying rollers to form two optically adhered plies of a dried single web.

The dried single web was coated on both sides with a solid moistureproofing coating, 0.000055" thick, by applying to both sides of the web a liquid moistureproofing coating composition consisting of a solvent-soluble vinylidene chloride/vinyl chloride copolymer dissolved in a mixture of equal parts of methyl ethyl ketone and toluene to yield a 10% solution. The copolymer was prepared, by the known emulsion polymerisation process, by polymerising a mixture comprising 50 parts of monomeric vinylidene chloride and 50 parts of monomeric vinyl chloride. The solvent was removed from the coating by evaporation by heat.

The edges of the coated single web were trimmed, and the web was separated into two moistureproof films each coated on one side only with a moistureproofing coating.

The moistureproof films, each coated on one side only with a moistureproofing coating, had a permeability value of 360.

The moistureproof films showed little tendency to fog when used as a wrapper with the uncoated side presented to vegetables or other moist commodities.

The following test has been used to measure the strength of the heat-seal bond: Two strips of the coated material 1½" wide are superimposed one on the other so that the coated faces of the films are in contact. A seal is made across the width of the material at one end by placing the film on a metal plate heated to 150° C. and rolling thereover for a period of 2 seconds an unheated roller ⅝" wide, weighted to 650 grams. The two strips so sealed are opened at the free ends and placed in a stretching device such as a Suter testing machine, by gripping each end of the sheet in suitable clamps, one of which is fixed while the other is moved away at a constant speed of 12" per minute. The force in grams required to pull the sheets apart is taken as a measure of the heat-seal bond strength. A heat-seal bond strength in excess of 60 is commercially acceptable.

By the expression "anchor" or equivalents (anchoring, anchorage and so forth) is meant the securing of the surface coating on the base in such a way that the resulting product will withstand the deleterious effects of water or of moisture. In other words, the surface coating will not loosen and/or flake off from the water-sensitive base film when the product is directly in contact with water for appreciable and substantial periods of time, for example at least ten minutes when immersed continuously in boiling water, or for at least 2 days when immersed in water at 20° C.

By the term "moistureproof" is meant a degree of impermeability of the coated film to water vapour of less than 690 grams per 100 square metres per hour over a 24 hour period at 39.5° C. (plus or minus 0.5° C.) at a humidity differential of at least 95%.

The permeability value was determined by the method of Church and Scroggie for measuring "permeability" as described in Paper Trade Journal TAPPI Section, October 3, 1935, pages 201–209.

We claim:

1. A process for the production of moistureproof regenerated cellulose film, coated on one side only with a moistureproofing coating, which process comprises bringing a pair of purified gel regenerated cellulose films into intimate contact without the intervention of an adhesive, drying the pair of films in continuous intimate contact to form two optically adhered plies of a dried single web, coating said dried single web on both sides with a moistureproofing coating, and finally separating the two plies of the coated web.

2. A process for the production of moistureproof regenerated cellulose film, coated on one side only with a moistureproofing coating, which process comprises bringing a pair of purified gel regenerated cellulose films produced simultaneously on the same casting machine into intimate contact without the intervention of an adhesive, drying the pair of films in continuous intimate contact to form two opically adhered plies of a dried single web, coating said dried single web on both sides with a moistureproofing coating, and finally separating the two plies of the coated web.

3. A process for the production of moistureproof regenerated cellulose film, coated on one side only with a moistureproofing coating, which process comprises bringing a pair of purified gel regenerated cellulose films of similar thickness when dried into intimate contact without the intervention of an adhesive, drying the pair of films in continuous intimate contact to form two optically adhered plies of a dried single web, coating said dried single web on both sides with a moistureproofing coating, and finally separating the two plies of the coated web.

4. A process for the production of moistureproof regenerated cellulose film, coated on one side only with a moistureproofing coating, which process comprises bringing a pair of purified gel regenerated cellulose films produced from supplies of viscose of similar characteristics into intimate contact without the intervention of an adhesive, drying the pair of films in continuous intimate contact to form two optically adhered plies of a dried single web, coating said dried single web on both sides with a moistureproofing coating, and finally separating the two plies of the coated web.

5. A process as claimed in claim 1 wherein the pair of purified gel regenerated cellulose films, prior to having been brought together into intimate contact, are treated separately with small proportions of a colloidal anti-sticking agent, and in which, after having been brought together, the pair are further treated in intimate contact so as to gain on their outer faces an amount of anti-sticking agent which is substantially greater than that held between the inner faces.

6. A process as claimed in claim 1 wherein the pair of purified gel regenerated cellulose films, after having been brought into continuous intimate contact but prior to drying, are treated with a liquid aqueous medium comprising colloidal matter in suspension, and also a known water-soluble softening agent for regenerated cellulose, in solution.

7. A process as claimed in claim 1 wherein the pair of purified gel regenerated cellulose films, after having been brought into continuous intimate contact but prior to drying, are treated with a liquid aqueous medium comprising colloidal sizing material in suspension, and also a known water-soluble softening agent for regenerated cellulose, in solution.

8. A process as claimed in claim 1 wherein the pair of purified gel regenerated cellulose films, after having been brought into continuous intimate contact but prior to drying, are treated with a liquid aqueous medium comprising colloidal matter in suspension and wherein the said colloidal matter consists of colloidal particles of a partially condensed condensation product of melamine and formaldehyde dispersed in an acidified aqueous medium.

9. A process as claimed in claim 1 wherein the pair of purified gel regenerated cellulose films, after having been brought into continuous intimate contact but prior to drying, are treated with a liquid aqueous medium comprising colloidal matter in suspension and wherein the said colloidal matter comprises hydrophilic colloidal particles of a partially condensed condensation product of urea and formaldehyde dispersed in a substantially neutral (pH 6 to 7.5) aqueous medium.

10. A process as claimed in claim 1 wherein the pair of purified gel regenerated cellulose films, after having been brought into continuous intimate contact but prior to drying, are treated with a liquid aqueous medium comprising a colloidal sizing material in suspension, the particles of said sizing material carrying electric charges of opposite sign to that of the electric charge developed by the purified gel regenerated cellulose film in contact with the liquid aqueous medium.

11. A process as claimed in claim 1 wherein the pair of purified gel regenerated cellulose films, after having been brought into continuous intimate contact but prior to drying, are treated with a liquid aqueous medium which comprises hydrophilic colloidal particles of a partially condensed condensation product of urea and formaldehyde dispersed in a substantially neutral (pH 6 to 7.5) aqueous medium the colloidal particles of said partially condensed condensation product carrying electric charges of opposite sign to that of the electric charge developed by the purified gel regenerated cellulose film in contact with the liquid aqueous medium.

12. A process as claimed in claim 10 wherein the electric charge developed by the purified gel regenerated cellulose film, when immersed in contact with the liquid aqueous medium, is of negative sign, and the electric charge of the colloidal particles suspended in the liquid aqueous medium is of positive sign.

13. A process as claimed in claim 11 wherein the electric charge developed by the purified gel regenerated cellulose film, when immersed in contact with the liquid aqueous medium, is of negative sign, and the electric charge of the colloidal particles suspended in the liquid aqueous medium is of positive sign.

14. A process for the production of moistureproof regenerated cellulose film, coated on one side only with a moistureproof liquid coating comprising an aqueous dispersion of a known copolymer, which process comprises bringing a pair of purified gel regenerated cellulose films into intimate contact without the intervention of an adhesive, drying the pair of films in continuous intimate contact to form two optically adhered plies of a dried single web, coating said dried single web on both sides with a moistureproofing coating, and finally separating the two plies of the coated web.

15. A process for the production of moistureproof regenerated cellulose film coated on one side only with a moistureproofing coating comprising a solution of nitrocellulose, paraffin wax of high melting point and other known ingredients dissolved in an organic solvent, which process comprises bringing a pair of purified gel regenerated cellulose films into intimate contact without the intervention of an adhesive, drying the pair of films in continuous intimate contact to form two optically adhered plies of a dried single web, coating said dried single web on both sides with the moistureproofing coating, and finally separating the two plies of the coated web.

16. A process for the production of moistureproof regenerated cellulose film, coated on one side only with a moistureproofing coating comprising an organic solvent solution of an organic solvent-soluble vinylidene chloride copolymer, which process comprises bringing a pair of purified gel regenerated cellulose films into intimate contact without the intervention of an adhesive, drying the pair of films in continuous intimate contact to form two optically adhered plies of a dried single web, coating said dried single web on both sides with the moistureproofing coating, and finally separating the two plies of the coated web.

17. A process for the production of moistureproof regenerated cellulose film, coated on one side only with a moistureproofing coating comprising a molten mixture of ethyl cellulose, resin, plasticiser and wax, which process comprises bringing a pair of purified gel regenerated cellulose films into intimate contact without the intervention of an adhesive, drying the pair of films in continuous intimate contact to form two optically adhered plies of a dried single web, coating said dried single web on both sides with the moistureproofing coating, and finally separating the two plies of the coated web.

18. A process as claimed in claim 1 wherein the pair of purified gel regenerated cellulose films, after having been brought into continuous intimate contact but prior to drying are treated with a liquid aqueous medium having colloidal matter in suspension which colloidal matter consists of a partially condensed condensation product of urea and formaldehyde and applying a liquid moistureproofing coating containing an acidic substance which acts as a catalyst for the further condensation of the partially condensed condensation product of urea and formaldehyde.

19. A process for the production of moistureproof regenerated cellulose film, coated on one side only with a moistureproofing coating, which process comprises the steps of bringing a pair of purified regenerated cellulose films in the gel state into continuous intimate contact, drying the pair of films in continuous contact so intimate that they constitute togeher an optically unitary film, coating said dried optically unitary film on both sides with a moistureproofing coating, and finally separating the films of the pair.

References Cited in the file of this patent

UNITED STATES PATENTS

| | | |
|---|---|---|
| 1,826,696 | Charch et al. | Oct. 6, 1931 |
| 1,983,520 | Charch et al. | Dec. 11, 1934 |
| 1,983,875 | Prindle | Dec. 11, 1934 |
| 2,046,848 | Royal | July 7, 1936 |
| 2,448,357 | Craig et al. | Aug. 31, 1948 |
| 2,587,171 | Kenewstubb et al. | Feb. 26, 1952 |
| 2,626,886 | Scholl | Jan. 27, 1953 |